Jan. 3, 1961 C. DI PIERI 2,966,792
METHODS AND APPARATUS TO DETERMINE THE
CHARACTERISTICS OF SHEET MATERIAL
Filed Oct. 7, 1957 2 Sheets-Sheet 1

United States Patent Office 2,966,792
Patented Jan. 3, 1961

2,966,792

METHODS AND APPARATUS TO DETERMINE THE CHARACTERISTICS OF SHEET MATERIAL

Ciro di Pieri, Padova, Italy, assignor of one-half to S.I.A.T.E.M. Societa Italiana Apparecchi Termo-Elettro-Meccanici Societa per Azioni, Padova, Italy, a joint-stock company of Italy Filed Oct. 7, 1957, Ser. No. 688,755

Claims priority, application Italy Nov. 21, 1956

6 Claims. (Cl. 73—15.6)

This invention relates to methods and equipment for measuring and testing the physical characteristics of foils and sheets made of resilient and thermoelastic materials ("thermoelastic materials" are those which become resilient due to heating).

Known equipment for the determination of the characteristics of foils and sheets of resilient and thermoelastic materials do not always fulfill their task, since the test and recording of such features must be made under conditions which closely correspond to those existing during the use of such foils and sheets.

For instance, a particular and very important case is that of thermoelastic materials (usually called "thermoplastics") which are widely used for vacuum molding or forming operations, wherein the foil is stretched in all directions. In such a case, it is essential, for the best use of material, that some of its characteristics—such as, for instance, tensile strength, elongation and the so called "elasic resistance" (the tendency of material to resume its original dimensions on cooling) be accurately known.

Equipment designed for testing resilient and thermoelastic materials must necessarily operate on a test piece submitted simultaneously to forces acting in all directions and distributed along a closed line.

The ways by which the above purpose can be attained require that forces be applied on different points of a test a piece circumference thereby causing an increase in the diameter of the test piece, or that a portion of a test piece be stressed in such a manner that the associated surface area remains constant.

The method according to this invention is based on the latter of above systems, and consists in having the test piece held all along its edges, and in stressing a portion thereof to cause, in at least one of its sections, practically coplanar reaction forces, starting from a common point or section and acting in all directions.

Said principle can be carried into practice in many forms, and above all in the specific case of the equipment through which the method according to the invention is carried out.

Such equipment is characterized by means to hold firmly the edges of the piece under test and by means to stress a portion of the test piece in order to cause, in at least one section thereof, practically coplanar reaction forces, starting from a common point or section, and acting in all directions therefrom.

In one embodiment of the method, the section of the test piece wherein the reaction forces arise is stressed by means of a pressure device having the required shape, and which is preferably an annularly shaped pressure device.

In such a case, said annular presser can be provided, all along its outline, with means to lower the friction resistance between the surface of test piece and the presser, and could, for example, consist of rolling devices or of a sheath made of a flexible, but non-resilient, material with one suitably anchored edge.

The main features of the invention will be disclosed in the following description of a few embodiments, by which the method according to the invention is carried into practice, the description being illustrated by the accompanying drawings.

In the drawings:

Fig. 1 diagrammatically shows the general principle whereon the method according to the invention is based.

Figure 7:
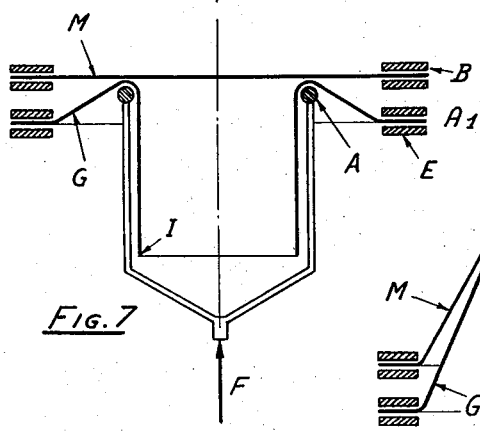
Figure 8:
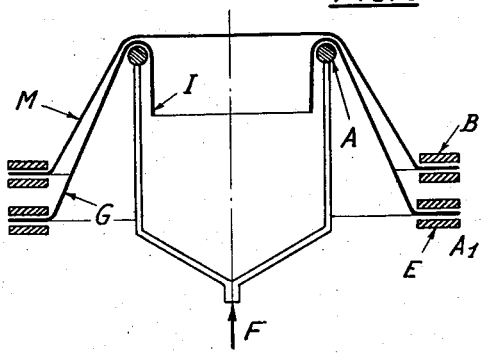
Figure 9:
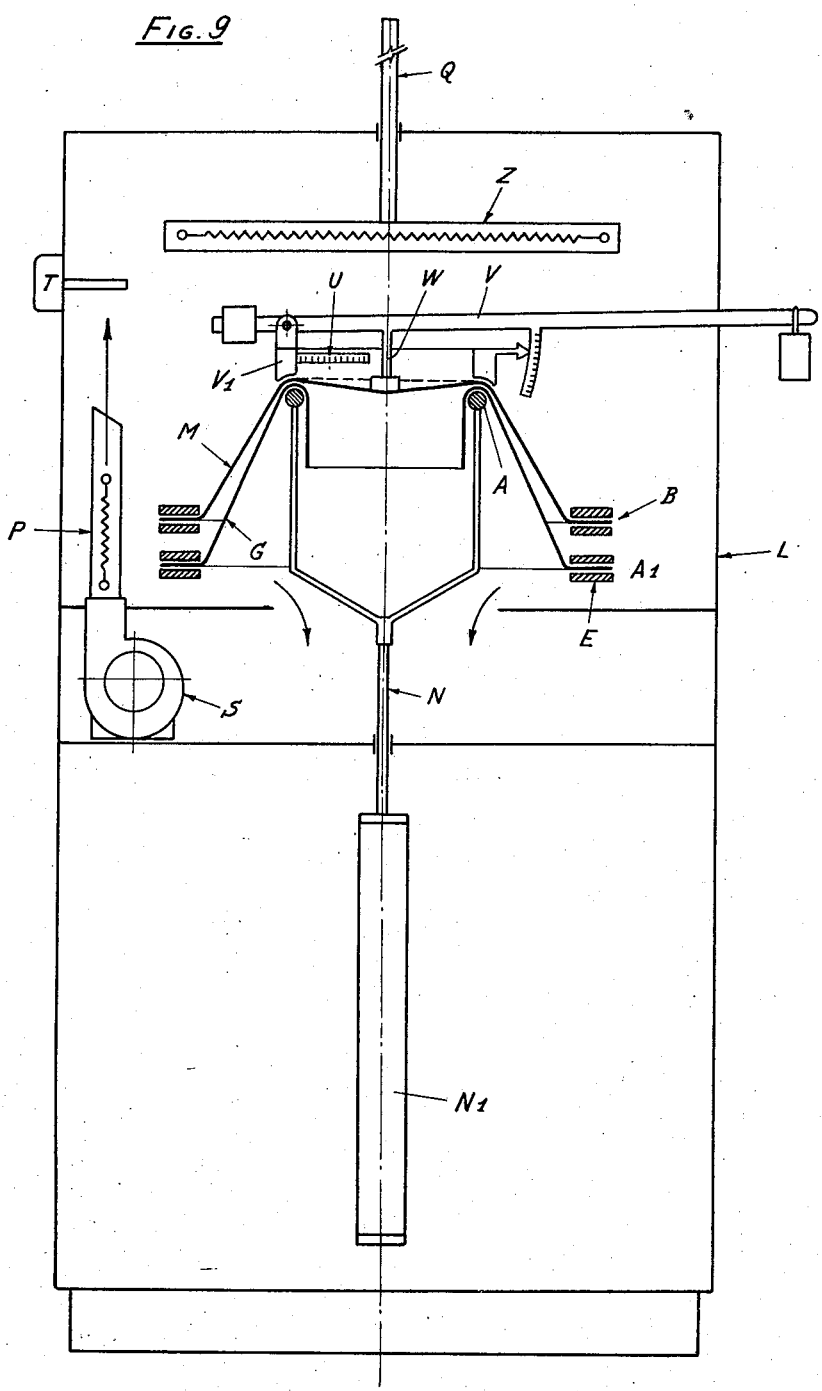

Figs. 7 and 8 diagrammatically show a further form of the equipment, also respectively represented at the beginning and at the end of a test, and Fig. 9 is a diagrammatic section of a preferred form of the equipment.

Figure 1:
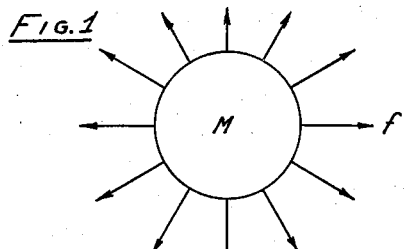

Referring now to Fig. 1, M is a test piece having a circular form and being stressed by radial and coplanar forces $f$ distributed continuously all along its periphery. The test piece M is stressed and thereby compelled to take a larger diameter by such forces acting on many points of its periphery.

According to the invention, only a portion of test piece, which area can remain constant, is stressed with such forces, by which further reaction forces are created in same test piece.

Figure 3:
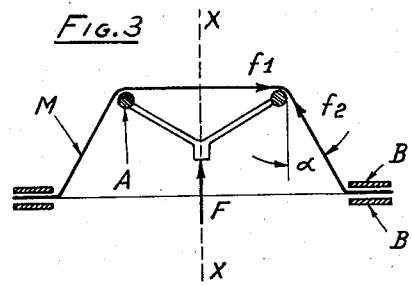
Figs. 2 and 3 show, also in a diagrammatic way, a first form of the equipment by which the method in question is carried into practice, the equipment being respectively shown at the start of the test and at the end thereof.
Figure 2:
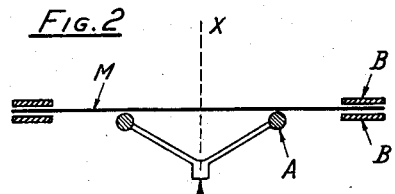

Referring now to Figs. 2 and 3, M is the sample of resilient material which is to be tested. Such test piece is pressed between two conveniently supported circular flanges B—B.

A rigid ring A, acting as pressure element or presser, is forced against the test piece M, along the axis X—X of said flanges, by a determined force F applied in any convenient manner to the presser.

When the ring A is pushed by the force F against the testpiece M, a deformation of the latter to the shape of a practically truncated cone takes place, as shown in the Fig. 3.

By assuming that no friction or rubbing takes place between the contacting surfaces of ring A and testpiece M, then the hereinafter stated conditions exist in the case of Fig. 3:

(i) The portion of testpiece M which is under the action of (or defined by) the ring A, is stretched due to forces $f_1$ which are strictly of the type indicated in Fig. 1 id est: radial, coplanar and continuously distributed forces all along the periphery of the portion.

(ii) The forces $f_2$ which must balance the forces $f_1$ (no friction) and are exactly equal to forces $f_1$.

(iii) The following relation must exist between the different forces:

$$\Sigma f_2 = \Sigma f_1 = \frac{F}{\cos \alpha}$$

where: $\Sigma f_2$ and $\Sigma f_1$ are respectively the sum of the forces $f_2$ and $f_1$, while F is the force that acts on the ring A, and $\alpha$ is the angle as shown in the figure.

Thus, with the equipment shown in Figs. 2 and 3, it is possible to have the material under test stressed by forces which show the most convenient configuration from a theoretical viewpoint, ascertaining at the same time the magnitude thereof and which permit measuring the elongation of the material in the different directions by measuring, for instance, the deformation of concentric circles previously drawn in the zone inside ring A.

When considering testpieces M, a shape other than circular, such as, for instance, polygonal can be used.

However, though it is possible to embody arrangements by which a minimum of friction results between the testpiece M and presser A, friction cannot be reduced to zero so that the equipment shown in Figs. 2 and 3, while allowing an accurate determination of stretch of testpiece M in all directions, does not permit an accurate measurement of the forces which are acting, since the forces $f_2$ will be always different (greater) from the forces $f_1$.

Figure 4:
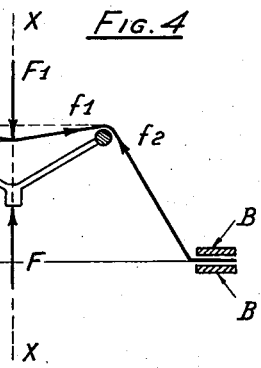
Fig. 4 shows a variation of the equipment of Figs. 2 and 3.

At any rate, the forces $f_1$ can be measured—whatever the friction might be—by having recourse to the method shown in Fig. 4, i.e. by stressing—after the conditions as shown in Fig. 3 have been attained—the central zone of the portion of testpiece M defined by the ring A, with a force $F_1$ (directed upward or downward) orthogonal to the plane in which the ring lines, and measuring then shifting H of said central zone with respect to original position.

Should shift H be small in comparison with the diameter of ring A, then the elongation of material as result of such operation can be considered as negligible, and since a steady relation exists between $F_1$, H and $\Sigma f_1$, after measurement of $F_1$ and H, the force $\Sigma f_1$ by which the testpiece M is acted upon can be obtained.

The determination referred to above can be made with different elongations of material and under different temperatures, thereby obtaining a complete record of the desired characteristics.

In Fig. 4, the force $F_1$ has been assumed as concentrated on the center of ring presser A, and H is the maximum shifting. However, it is to be understood that the same method can be applied by distributing the force $F_1$ on a more or less large area, and then measuring the deformation of the material within said ring A.

Figure 5:
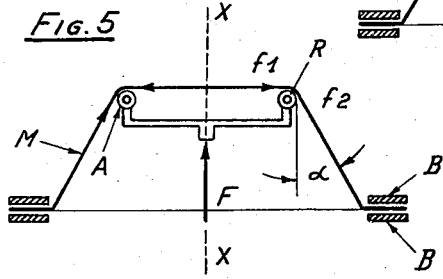
Fig. 5 shows a further embodiment of the invention.
Figure 6:
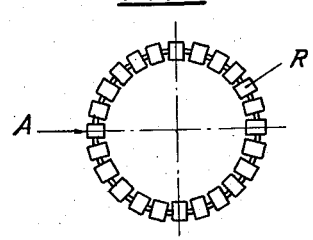
Fig. 6 is a plan view of the equipment according to Fig. 5.

The device shown in Figs. 2 and 3 together with the arrangement shown in Figure 4 can be very conveniently carried into practice in the form shown as an example in Figs. 5 and 6, wherein the ring presser A is provided, all along its outside periphery, with a series of rollers R, each being rotatable on an axis orthogonal to a corresponding radius starting from center of testpiece M, whereby they are caused to roll, all at the same time, by the action of the testpiece thereagainst.

The aforedescribed arrangement is particularly suitable since it allows reducing the friction—while the testpiece M is being stretched—to comparatively small values, thus permitting a coarse determination of $\Sigma f_1$, based on the measurement of F, and above all because the difference between the forces $f_2$ and $f_1$ is thereby reduced to a minimum.

The latter condition is essential, as otherwise the greatest stretch would occur in the portion of material which is acted upon by the forces $f_2$, and not in the portion of testpiece defined by the ring A, whereby it would not be possible to carry out the test up to the yield point of material, since the material would break outside and not inside the ring presser.

An arrangement which allows making $f_1 \cong f_2$ is shown in the Figs. 7 and 8. In said figures, the different members equipment which correspond to those of Figs. 2 and 3 are marked with the same reference letters.

In such embodiment, the ring A is covered by a sheath G, made of a flexible, but non-elastic material, and which end E, outside the presser ring, is anchored to the fixed ring $A_1$, while the opposite end I, inside pressure ring A, is free.

Assuming that the test is carried out by starting from the position as shown in Fig. 7, wherein the presser ring A is just into contact with the testpiece M through the interposed sheath G, then, by forcing the ring A against the testpiece M, positions like that as shown in the Fig. 8 will be successively attained, and each one of such positions is reached by causing the sheath G to slide across the ring A, due to the fixed position of its end E.

As the testpiece M adheres to sheath G pressing this latter against the ring A, it will be dragged along with the sheath, establishing thereby such conditions that—should a sliding of sheath across the testpiece M occur—$f_2$ is smaller than $f_1$.

More precisely, said arrangement allows to attain the hereinafter stated ideal conditions:

(a) Stretching of material by forces $f_1$ of the type as stated with respect to Fig. 1, continuously distributed all along the circumference or, should the ring A show a shape other than circular, all along the perimeter.

(b) The forces $f_1$ are equal to, or greater than all other forces by which the material being tested is acted upon, whereby the yield point is approached in the section under test.

In practice, the sheath G consists of a hose of knitted textile fibres or wire fabric. Recourse could be made also to a row of parallel wires or bands, overlapping or not across the ring A, or to any other suitable procedure complying with the principle of having a continuous or discontinuous layer of material interposed between the ring A and the testpiece M, in order to drag along with it, when sliding, the testpiece M.

A general view of a complete device, based on the principles as stated with reference to Figs. 7 and 8, is shown, in Fig. 9. In the latter figure, the same members are marked with same reference letters. The members M, A, B and G are fitted within a cabinet L with transparent walls.

The ring A is secured to a rod N conveniently driven by a motor $N_1$, in order to move the ring upward, and to bring it back to its starting position.

Air heated by the electric resistances P up to a temperature controlled by the thermostat T, is circulated through the cabinet L by a blower S.

Moreover, a radiant heater Z supported by an upright support Q which allows adjustment thereof to the required height above the testpiece M, is provided for tests wherein the materials being tested are to be heated by such a system, and not by hot air (to simulate the conditions which exist, for instance, in vacuum forming).

Finally, a movable frame $V_1$ supports a rule with a millimeter graduation U, by which the elongation of testpiece M is measured, as well as a balance device V, connected with an auxiliary presser W by which the force $F_1$ is applied, and this serves, as shown in Fig. 4, for the measurement of force $\Sigma f_1$.

It is to be understood that recourse could be made also to further forms, provided that they meet the requirements stated above.

While the invention has been described in detail, it is to be understood that the description is for the purpose of illustration only, and is not definitive of the limits of the inventive idea.

What I claim is:

1. Apparatus for testing a sheet comprising a ring for anchoring at least a portion of the sheet along a closed line, a ring engaging a section of said portion and movable axially with respect to the first said ring, means for displacing the second said ring, a flexible member interposed between said sheet and the second said ring, and means to anchor the flexible member so that movement of the second said ring applies frictional forces continuously along the periphery of said section.

2. Apparatus as claimed in claim 1, comprising a housing enclosing said rings and a source of heat within said housing.

3. Apparatus as claimed in claim 1, comprising means for applying a thrust against said section centrally thereof in a direction opposite to that of the second said ring.

4. Apparatus as claimed in claim 2, wherein said source is a source of indirect heat.

5. Apparatus as claimed in claim 2, wherein said source is a source of direct heat superposed over said sheet.

6. A method of testing a sheet of material comprising anchoring the periphery of the sheet, defining an area of the sheet and supporting the area along its periphery, continuously exerting tensile forces on the periphery of said area to stretch the same, said forces being applied by friction and being parallel to the plane of said area, the friction forces resulting from a thrust applied perpendicularly of said area, and applying a further thrust force centrally of said area and opposite to the first said thrust which is applied at the periphery of said area.

References Cited in the file of this patent

UNITED STATES PATENTS

| | | |
|---|---|---|
| 1,371,050 | Olsen | Mar. 8, 1921 |
| 1,653,714 | Lewis et al. | Dec. 27, 1927 |
| 2,339,855 | Hodil et al. | Jan. 25, 1944 |
| 2,469,013 | Sobota | May 3, 1949 |